H. H. WESTINGHOUSE.
Assignor to THE WESTINGHOUSE MACHINE COMPANY.
STEAM ENGINE LUBRICATING ATTACHMENT.
No. 10,586. Reissued Apr. 21, 1885.
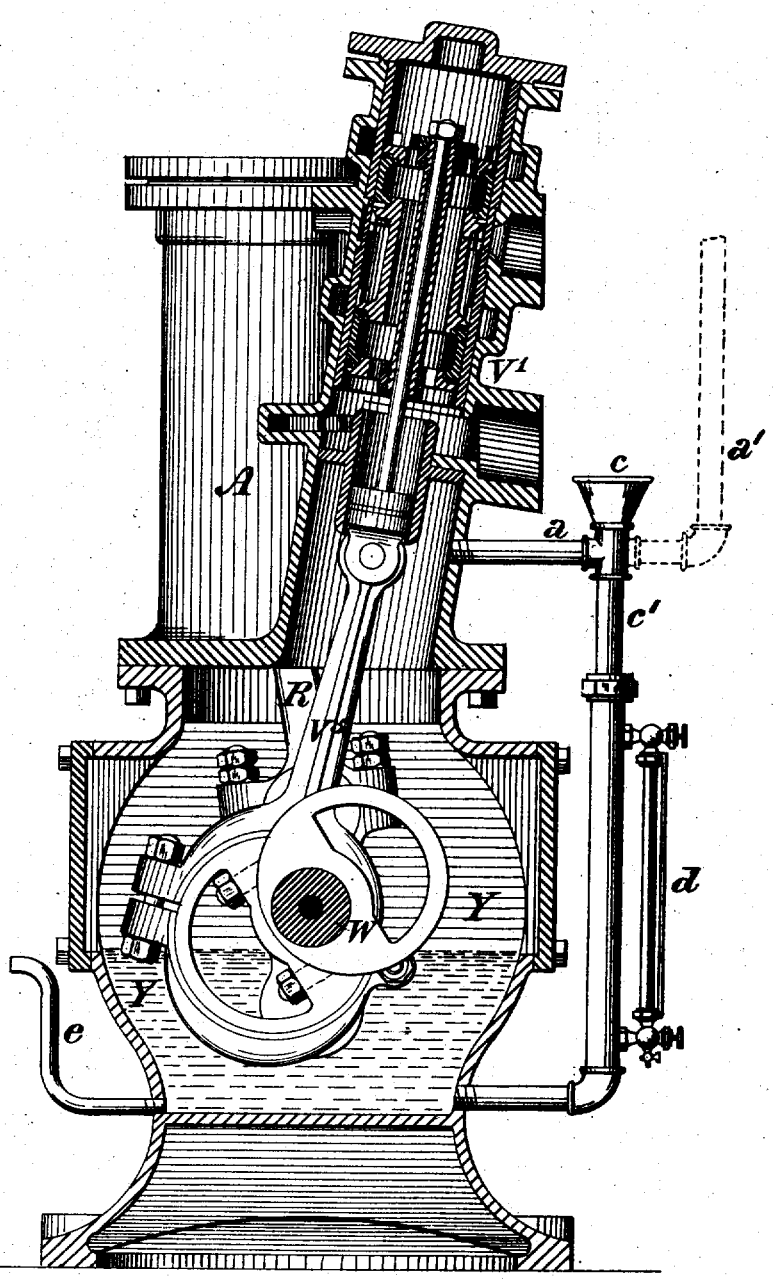
Witnesses:
J. Thornton Bell
R. A. Whiteley
Inventor:
H. Herman Westinghouse,
by George H. Christy, Atty.

UNITED STATES PATENT OFFICE.

H. HERMAN WESTINGHOUSE, OF NEW YORK, N. Y., ASSIGNOR TO THE WESTINGHOUSE MACHINE COMPANY, OF PITTSBURG, PENNSYLVANIA.

STEAM-ENGINE-LUBRICATING ATTACHMENT.

SPECIFICATION forming part of Reissued Letters Patent No. 10,586, dated April 21, 1885.

Original No. 271,005, dated January 23, 1883. Application for reissue filed March 25, 1885.

*To all whom it may concern:*

Be it known that I, H. HERMAN WESTINGHOUSE, formerly of Pittsburg, county of Allegheny, State of Pennsylvania, but now of the city of New York, in the county and State of New York, have invented or discovered a new and useful Improvement in Steam-Engine-Lubricating Attachments; and I do hereby declare the following to be a full, clear, concise, and exact description thereof, reference being had to the accompanying drawing, making part of this specification.

The figure represents a vertical sectional view of an upright double-cylinder single-acting steam-engine operating by a direct connection, and with the features of improvement hereinafter described and claimed applied thereto.

The steam-engine shown in the drawing has substantially the construction and operation shown and described in Patent No. 240,482, granted to me April 19, 1881; but I have shown it only as one form of engine to which my present improvements may be applied.

A represents one of the steam-cylinders, and V′ the valve-chamber. Direct connection is made by pitman R and connecting-rod $V^5$ with the proper cranks or eccentrics on the main shaft W. A close oil-tank is also provided, and the shaft W passes through the same in such manner that at each downstroke of pistons and valve the cranks or eccentrics will dash violently into the oil or other lubricant in the tank, and by a pump, as in said patent or in Patent No. 246,258, or by a spraying or spattering action, will effect the proper lubrication of the moving parts.

Now, I have found in the use of engines of this class that steam will sometimes leak into the vat Y, or, in consequence of the heat, the oil or other lubricant in the vat will give off vapors in small amount, and that these should have a vent, and obviously any vent that may be provided should be such that oil cannot by spraying or spattering permanently escape thereat; and I have also found that the steam which so leaks into the vat will sometimes condense, and provision should be made so that the water of condensation, when it becomes excessive in amount, shall pass off and escape, and thereby the oil in the vat shall always stand at a uniform or nearly uniform level. In order to provide for the escape of steam and oily vapor and prevent loss of oil, I insert a vent-pipe, *a*, at any desired point above the level of the oil, and, preferably, at a considerable distance above, and carry such vent-pipe *a* out to such distance or in such direction that any drops of oil that may be spattered into it will drop or come practically to rest. The outer end of such pipe opens into a pipe or funnel, *c*, open at its upper end, so that steam and vapor may escape freely, and also into a return drip-pipe, *c′*, which latter leads back into the vat. Then the oil which may enter the vent-pipe *a* will run into the pipe *c′* and back into the vat; and this pipe *c′* gives a convenient means of attaching a glass gage, *d*, by which to note the height of the oil in the tank or vat Y.

In cases where trouble is experienced or is liable to arise from the presence of water of condensation in the vat in excessive amount, I add a pipe, *e*, which enters the vat at a point below the lowest level or bottom of the oil-stratum and extends upward to the height of the surface of the oil or to the height at which it is desired the oil should be maintained. The pipe *e* may here have a free discharge or extend off to any point or place of waste. Then water of condensation, as it accumulates in the vat, will settle at the bottom, and as it becomes excessive in amount will flow off freely by the pipe *e*. It will be understood that the presence of a moderate amount of water in the bottom of the vat beneath the oil is no objection, and on some accounts is an advantage.

The device thus described may be used advantageously as an attachment to any form or style of engine having a close or comparatively close oil-vat, wherein lubrication of some or all of the moving parts is effected by the spraying or spattering of the lubricant effected by the movements of the crank-shaft.

The feature of a vent and drip pipe may be embodied in a somewhat modified form by extending the pipe *a* with an upward bend, as represented by dotted outline at *a′*; but in such case the pipe should be so shaped and of such length that uncondensed gases and vapors may be carried off and the escape of oil or water in condensed form shall be prevented, and whatever may get into such pipe will be carried back into the vat.

I claim herein as my invention—

1. As an improvement in the class of engines in which lubrication of the moving parts is effected wholly or in part by the splashing of the oil effected by the piston and valve-stem connections, the combination of a close oil-vat and a vent-pipe leading therefrom, substantially as set forth.

2. As an improvement in the class of engines in which lubrication of the moving parts is effected wholly or in part by the splashing of the oil effected by the piston and valve-stem connections, the combination of a close oil-vat and a vent and return drip-pipe, substantially as set forth.

3. In combination with a close oil-vat, Y, of a steam-engine, a vent-pipe, *a*, escape opening or funnel *c*, and drip-pipe *c'*, substantially as set forth.

4. In combination with close oil-vat Y and the cylinders and valve-chambers A V, a water-escape pipe, *e*, entering the vat at or near the bottom and rising to the normal oil-level of the vat, substantially as set forth.

In testimony whereof I have hereunto set my hand.

H. HERMAN WESTINGHOUSE.

Witnesses:
ROBERT McC. ROBINSON,
RICHMOND BREWER.